United States Patent
Bermudez

(10) Patent No.: US 12,141,875 B2
(45) Date of Patent: *Nov. 12, 2024

(54) SYSTEMS AND METHODS FOR PREDICTIVE MODEL GENERATION

(71) Applicant: Capital One Services, LLC, McLean, VA (US)

(72) Inventor: Sophie Bermudez, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/353,150

(22) Filed: Jun. 21, 2021

(65) Prior Publication Data

US 2021/0312566 A1 Oct. 7, 2021

Related U.S. Application Data

(63) Continuation of application No. 16/729,155, filed on Dec. 27, 2019, now Pat. No. 11,068,997.

(51) Int. Cl.
*G06Q 40/08* (2012.01)
*G06N 20/00* (2019.01)
(Continued)

(52) U.S. Cl.
CPC .............. *G06Q 40/08* (2013.01); *G06N 20/00* (2019.01); *G06Q 30/0201* (2013.01);
(Continued)

(58) Field of Classification Search
CPC ............... G06Q 40/08; G06Q 30/0201; G06Q 30/0206; G06Q 30/0645; G06Q 50/30; G06N 20/00
(Continued)

(56) References Cited

U.S. PATENT DOCUMENTS 6,263,320 B1  7/2001  Danilunas et al.
6,704,644 B1  3/2004  Kobayashi et al.
(Continued)

FOREIGN PATENT DOCUMENTS

CN      111328401 A  *  6/2020  ......... G05B 13/0265
WO   WO-2007118690 A1  * 10/2007  ............. G06Q 20/10
(Continued)

OTHER PUBLICATIONS

Galit Shmueli and Otto R. Koppius. Predictive Analytics in Information Systems Research. MIS Quarterly, Sep. 2011, vol. 35, No. 3 (Sep. 2011), pp. 553-572. (Year: 2011).*

(Continued)

*Primary Examiner* — Virpi H Kanervo
(74) *Attorney, Agent, or Firm* — HUNTON ANDREWS KURTH LLP

(57) ABSTRACT

A predictive model system may include an application comprising instructions for execution on a device including one or more processors coupled to memory, and one or more servers in data communication with the application. The one or more servers may be configured to receive a first set of data which may be updated to include transaction data and at least one selected from the group of mileage rental information; create a predictive model based on the first set of data; transmit, to the application, one or more requests including a second set of data, the second set of data comprising at least one selected from the group of location information, date, time, name, and age of a user; update the predictive model based on the received second set of data received; generate a dynamic rate based on the updated predictive model; and transmit, to the application, the dynamic rate.

20 Claims, 3 Drawing Sheets

(51) Int. Cl.
*G06Q 30/0201* (2023.01)
*G06Q 30/0645* (2023.01)
*G06Q 50/40* (2024.01)

(52) U.S. Cl.
CPC ..... *G06Q 30/0206* (2013.01); *G06Q 30/0645* (2013.01); *G06Q 50/40* (2024.01)

(58) Field of Classification Search
USPC .......................................................... 705/4
See application file for complete search history.

(56) References Cited

U.S. PATENT DOCUMENTS

| | | |
|---|---|---|
| 7,734,530 B1 | 6/2010 | Domingue, Sr. et al. |
| 7,801,750 B1 | 9/2010 | Wallach et al. |
| 7,865,378 B2 | 1/2011 | Gay |
| 7,890,355 B2 | 2/2011 | Gay et al. |
| 7,987,103 B2 | 7/2011 | Gay et al. |
| 7,991,629 B2 | 8/2011 | Gay et al. |
| 8,364,702 B2 | 1/2013 | Kerr et al. |
| 10,115,164 B1* | 10/2018 | Binion .................. B60W 50/14 |
| 2001/0034700 A1 | 10/2001 | Foss et al. |
| 2002/0032586 A1 | 3/2002 | Joao |
| 2003/0120564 A1 | 6/2003 | Jarrett et al. |
| 2003/0130966 A1 | 7/2003 | Thompson et al. |
| 2004/0172304 A1 | 9/2004 | Joao |
| 2007/0143195 A1 | 6/2007 | Bell et al. |
| 2007/0299700 A1 | 12/2007 | Gay et al. |
| 2009/0094144 A1 | 4/2009 | Schmidt et al. |
| 2011/0320223 A1 | 12/2011 | Drennan, III et al. |
| 2012/0059725 A1 | 3/2012 | Colson et al. |
| 2013/0173453 A1 | 7/2013 | Raines et al. |
| 2014/0074512 A1 | 3/2014 | Hare et al. |
| 2014/0081670 A1 | 3/2014 | Lim et al. |
| 2014/0278578 A1 | 9/2014 | Cantwell et al. |
| 2015/0310466 A1 | 10/2015 | LaCivita et al. |
| 2015/0324920 A1 | 11/2015 | Wilson et al. |
| 2015/0348178 A1* | 12/2015 | Taylor ................ G06Q 30/0645 705/307 |
| 2016/0267504 A1 | 9/2016 | Battista |
| 2017/0308960 A1* | 10/2017 | Mascaro .............. G06Q 40/123 |
| 2018/0025551 A1* | 1/2018 | Centner ............. G06K 7/10297 705/13 |
| 2018/0061150 A1* | 3/2018 | Harish .................... G01C 21/10 |
| 2018/0365674 A1* | 12/2018 | Han ....................... G06Q 30/06 |
| 2019/0347739 A1* | 11/2019 | Fuchs .................... G06Q 40/08 |
| 2021/0312560 A1* | 10/2021 | Hayward ............... G06N 3/088 |

FOREIGN PATENT DOCUMENTS

| | | |
|---|---|---|
| WO | 201721645 A2 | 12/2017 |
| WO | WO-2021012504 A1 * | 1/2021 ........... G08G 1/0967 |

OTHER PUBLICATIONS

A. Nagabandi, G. Kahn, R. S. Fearing and S. Levine, "Neural Network Dynamics for Model-Based Deep Reinforcement Learning with Model-Free Fine-Tuning," 2018 IEEE International Conference on Robotics and Automation (ICRA), Brisbane, QLD, Australia, 2018, pp. 7559-7566. (Year: 2018).*
Panos Desyllas and Mari Sako. Profiting from Business Model Innovation: Evidence from Pay-As-You-Drive Auto Insurance. Research Policy 42 (2013) 101-116. (Year: 2013).*
Desyllas, Panos, and Mari Sako. "Profiting from business model innovation: Evidence from Pay-As-You-Drive auto insurance." Research Policy 42.1 (2013): 101-116. (Year: 2013).*
Paefgen et al, "Multivariate Exposure Modeling of Accident Risk: Insights from Pay-As-You-Drive Insurance Data", Transportation Research Part A 61 (2014) 27-40 (Year: 2014).

* cited by examiner

SYSTEMS AND METHODS FOR PREDICTIVE MODEL GENERATION

CROSS-REFERENCE TO RELATED APPLICATION

The subject application is a continuation of Ser. No. 16/729,155 filed Dec. 27, 2019, the complete disclosure of which is incorporated herein by reference in its entirety.

FIELD OF THE DISCLOSURE

The present disclosure relates to systems and methods for predictive model generation.

BACKGROUND

Rental car insurance is often a single static standard rate and not targeted towards a particular individual. Nor does an individual possess control in selecting the rate or receive incentives associated with the rate.

These and other deficiencies exist. Accordingly, there is a need to provide users with an appropriate solution that overcomes these deficiencies which provides improved reliability, increased accuracy in predictive model generation, and enhanced user interaction experience by customizing a specific tailored dynamic rate.

SUMMARY OF THE DISCLOSURE

Embodiments of the present disclosure provide a predictive model system including an application comprising instructions for execution on a device including one or more processors coupled to memory. The predictive model system may include one or more servers in data communication with the application, the one or more servers including one or more processors coupled to memory. The one or more servers may be configured to receive a first set of data, the first set of data including transaction information. The one or more servers may be configured to update the first set of data to include at least one selected from the group of mileage information and rental information. The one or more servers may be configured to create a predictive model based on the updated first set of data. The one or more servers may be configured to transmit, to the application, one or more requests, the one or more requests including a second set of data, the second set of data comprising at least one selected from the group of location information, date, time, name, and age of a user. The one or more servers may be configured to update the predictive model based on the second set of data received from the application. The one or more servers may be configured to generate a dynamic rate based on the updated predictive model. The one more servers may be configured to transmit, to the application, the dynamic rate. The application may be configured to receive the one or more requests from the one or more servers. The application may be configured to transmit, to the one or more servers, one or more responses including the second set of data based on the one or more requests. The application may be configured to display the dynamic rate based on the updated predictive model.

Embodiments of the present disclosure provide a method of generating a predictive model including: retrieving, with one or more processors, transaction data, wherein the transaction data is updated to include at least one selected from the group of mileage data and rental data; training, by the one or more processors, a predictive model based on the updated transaction data; transmitting, by the one or more processors, one or more requests for a plurality of parameters including at least one selected from the group of location data, date data, time data, name data, and age data; receiving, by the one or more processors, the one or more requests including the plurality of parameters; transmitting, by the one or more processors, one or more responses based on the one or more requests, the one or more responses including at least one selected from the group of location data, date data, time data, name data, and age data; updating, by the one or more processors, the predictive model based on the one or more responses; producing, by the one or more processors, a dynamic rate based on the updated predictive model; and executing, by the one or more processors, a display of an output of the dynamic rate.

Embodiments of the present disclosure provide a computer readable non-transitory medium comprising computer-executable instructions that are executed on a processor and comprising the steps of: retrieving transaction data, wherein the transaction data is updated to include at least one selected from the group of mileage data and rental data; training a predictive model based on the updated transaction data; transmitting one or more requests for a plurality of parameters including at least one selected from the group of location data, date data, time data, name data, and age data; receiving the one or more requests including the plurality of parameters; transmitting one or more responses based on the one or more requests, the one or more responses including at least one selected from the group of location data, date data, time data, name data, and age data; updating the predictive model based on the one or more responses; producing a dynamic rate based on the updated predictive model; and executing a display of an output of the dynamic rate.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

As described herein, systems and methods are configured to dynamically price a rate using various sets of data by creating a predictive model, supplementing the predictive model, and training the predictive model so as update the predictive model and thereby allow a selection of an outputted rate in real-time. The rate may be subject to certain conditions and may be adjusted to account for incentives. The implementations described herein also take into consideration previous rental history of an individual so as to train and update the predictive model to adjust the rate. In addition, there may locations and times where accidents are more likely to occur based on historical data, which are also factored in training and updating the predictive model to adjust the rate.

Figure 1:
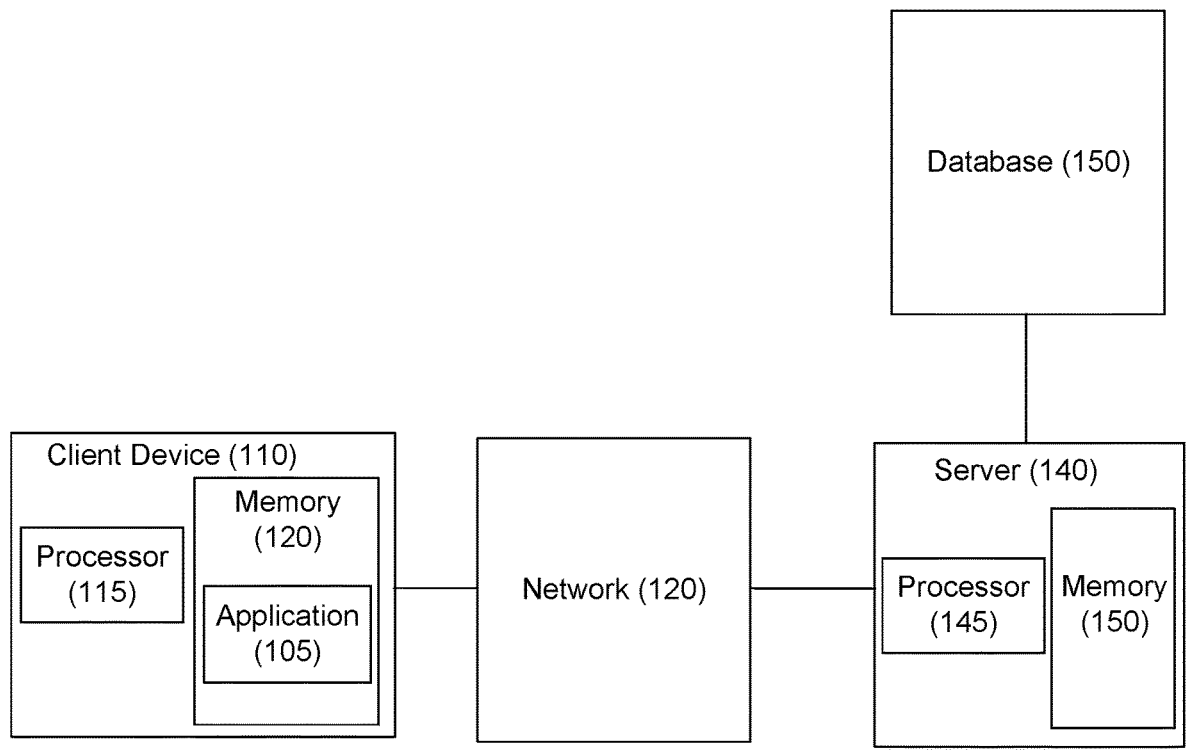
FIG. 1 depicts a predictive model system according to an exemplary embodiment.

FIG. 1 illustrates a predictive model system 100 according to an exemplary embodiment. As further discussed below, system 100 may include a client device 110; a network 130; a server 140; and a database 160. Although FIG. 1 illustrates single instances of components of system 100, system 100 may include any number of components.

System 100 may include client device 110. For example, client application 105 may comprise instructions for execution on a client device 110. The client device 110 may include one or more processors 115 coupled to memory 120. For example, client device 110 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 110 can include a processor 115 and a memory 120, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 may execute one or more applications, such as software applications, that enable, for example, network communications with one or more components of system 100 and transmit and/or receive data.

Client device 110 may be in communication with one or more servers 140 via one or more networks 130, and may operate as a respective front-end to back-end pair with server 140. Client device 110 may transmit, for example from a mobile device application 105 executing on client device 110, one or more requests to server 140. The one or more requests may be associated with retrieving data from server 140. Server 140 may receive the one or more requests from client device 110. Based on the one or more requests from client device 110, server 140 may be configured to retrieve the requested data from one or more databases 160. Based on receipt of the requested data from the one or more databases 160, server 140 may be configured to transmit the received data to client device 110, the received data being responsive to one or more requests.

System 100 may include a network 130. In some examples, network 130 may be one or more of a wireless network, a wired network or any combination of wireless network and wired network, and may be configured to connect to any one of components of system 100. For example, client device 110 may be configured to connect to server 140 via network 130. In some examples, network 130 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 130 may include, without limitation, telephone lines, fiber optics, IEEE Ethernet 902.3, a wide area network, a wireless personal area network, a LAN, or a global network such as the Internet. In addition, network 130 may support an Internet network, a wireless communication network, a cellular network, or the like, or any combination thereof. Network 130 may further include one network, or any number of the exemplary types of networks mentioned above, operating as a stand-alone network or in cooperation with each other. Network 130 may utilize one or more protocols of one or more network elements to which they are communicatively coupled. Network 130 may translate to or from other protocols to one or more protocols of network devices. Although network 130 is depicted as a single network, it should be appreciated that according to one or more examples, network 130 may comprise a plurality of interconnected networks, such as, for example, the Internet, a service provider's network, a cable television network, corporate networks, such as credit card association networks, and home networks.

System 100 may include one or more servers 140. In some examples, server 140 may include one or more processors 145, which are coupled to memory 150. Server 140 may be configured as a central system, server or platform to control and call various data at different times to execute a plurality of workflow actions. Server 140 may be configured to connect to one or client device 110, and database 160.

System 100 may include a database 160. As explained above database 160 may be called to retrieve any type of data. The data may be requested server 140 or client device 110. In some examples, database 160 may be configured to communicate with one or more components of system.

The one or more servers 140 may be in data communication with the client application 105. For example, a server 140 may be in data communication with the client application 105 via one or more networks 130. The one or more servers 140 may be configured to receive a first set of data.

In some examples, the first set of data may include transaction information. The first set of data may be retrieved from one or more servers 140, databases 160, and/or client application 105. Without limitation, transaction information may comprise at least one selected from the group of debit card transaction information, credit card transaction information, and account transaction information. In some examples, at least one selected from the group of mileage information and rental information may be derived from the transaction information. The first set of data or transaction information may be updated to further comprise this information.

In some examples, mileage information may be derived from the transaction information. For example, an initial transaction may occur at the start of the rental session, e.g., when a rental vehicle is obtained, and a subsequent transaction may occur at the end of the rental session, e.g., when the rental vehicle is returned. Location information associated with the transaction, such as location information relating to the rental vehicle pickup and return locations, may be collected. Additional location information relating to movement of the rental vehicle, including without limitation, Global Positioning System (GPS) data, can be collected from various sources. For example, GPS data may be collected by the client device 110, the client application 105, and/or another application or device in data communication with or accessible to the server 140. Mileage information may then be estimated from the location information. The location information may be collected continuously or upon the start and conclusion of the rental session, and the location data may be included in data used to update and train the predictive model.

In some examples, rental information may be derived from the transaction information. Rental information can include, without limitation, rental agency, type of rental (e.g., short-term, long-term, same day), dates, duration, number of drivers, driver identification, and restrictions (e.g., geographic or mileage limitations). The rental information may be collected continuously or upon the start and conclusion of the rental session, and the location data may be included in data used to update and train the predictive model.

Based on the first set of data, including but not limited to the updated first set of data, the one or more servers 140 may be configured to create a predictive model. For example, the predictive model may be developed by machine learning using at least one algorithm selected from the group of a gradient boosting machine algorithm, a logistic regression algorithm, and a neural network algorithm. As the predictive model continues to be trained, it increases its specificity and becomes more targeted to a particular individual. In some examples, the more frequent an individual rents, such as via the client application 105, the better the rate may be, thereby improving the user interaction experience. However, as further explained below, the rate may be subject to one or more conditions, including but not limited to user accident history, vehicle accident history, and transit route. In some examples, if there is another bill associated with the same vehicle, then this information may be analyzed by server 140 to determine if there is an indication that one or more transactions of the bill is associated with an accident. Thus, the predictive model may be configured to take into account additional bills of transactions, including but not limited to vehicle gas bills and vehicle accident bills, that may be related to the same vehicle, and thereby be configured to adjust and respond to analysis of bills.

To update and train the predictive model, the one or more servers 140 may be configured to transmit one or more requests to the client application 105. In some examples, the one or more requests may include a request for a second set of data. Without limitation, the second set of data may comprise at least one selected from the group of location information, date, time, name, age of a user, total miles, and rental insurance. The location information may include pick up and drop off location for the vehicle.

The client application 105 may be configured to receive the one or more requests from the one or more servers 140. For example, the client application 105 may be configured to receive one or more requests including a request for a second set of data. Responsive to the one or more requests from the one or more servers 140, the client application 105 may transmit one or more responses to the one or more servers 140. For example, the one or more responses may include the requested second set of data and include at least one selected from the group of the location information, date, time, name, and age of a user.

The one or more servers 140 may be configured to receive the one or more responses from the client application 105. In some examples, the one or more servers 140 may be configured to update the predictive model based on the second set of data received from the client application 105. The one or more servers 140 may be configured to generate a dynamic rate based on the updated predictive model. The one or more servers 140 may be configured to transmit the dynamic rate to the client application 105. As further explained herein, in some examples, the rate may be dynamically adjusted for cheaper or safer users. As further explained herein, in other examples, the rate may be dynamically adjusted for unsafe or risk-prone users. By lowering the pricing of the rate, the users may be incentivized who would not normally obtain rental insurance.

The client application 105 may be configured to receive the dynamic rate from the one or more servers 140. In some examples, the client application 105 may output the dynamic rate based on the updated predictive model via at least one selected from the group of a pop-up notification, email, display, video, short message service, multimedia messaging service, and the like. Moreover, the client application 105 may be configured to display a plurality of options based on the dynamic rate. The plurality of options may include a plurality of rates that include accompanying descriptions for each rate. In one example, at least one of the rates may be categorized as a basic version for rental insurance. Without limitation, the basic version may be priced at the lowest cost, and the scope of coverage may include only include accidents that occur under a designated speed limit, a designated time of day, week, month, or year which may take into account events and/or holidays and/or seasons, and a designated amount for damage, or any combination thereof. In another example, at least one of the rates may be categorized as an intermediate version for rental insurance. Without limitation, the intermediate version may priced at a cost between the basic version and the advanced version, and the scope of coverage may include limited damage to the vehicle, personal injury protection to one or more drivers that exceeds coverage than that which is prescribed in the basic version yet is more restrictive than the coverage that is prescribed in the advanced version. In yet another example, at least one of the rates may be categorized as an advanced version for rental insurance. Without limitation, the advanced version may be priced at the highest cost, and the scope of coverage may include all damages to the vehicle, personal injury protection, and additional drivers, or any combination thereof.

The client application 105 may be configured to receive a selection of at least one option based on the dynamic rate. In some examples, prior to display of the dynamic rate, the client application 105 may be configured to prompt a user to perform at least one selected from the group of inputting one or more login credentials and creating an account.

In some examples, once a user selects, via client application 105, at least one option of the rate, the predictive model may be configured to adjust the rate during transit or after completion of a rental session. For example, if the predictive model determines that the user drives safely and encounters minimal to zero accidents, the rate may decrease from one price, such as $30, to a second price, such as $20, after the vehicle is dropped off at a destination so as to terminate the rental session. In another example, if the predictive model determines that the user did not drive safely and encounters an accident, the rate may increase from one price, such as $30, to a second price, such as $40, after the vehicle is dropped off at a destination so as to terminate the rental session. In some examples, the rate may decrease during transit. In one example, the predictive model may be configured to compute a reduced rate when it determines that the driver opts into a route with reduced vehicles and/or traffic. In another example, the rate may be adjusted after transit. For example, the predictive model may configured to compute a reduced rate when it determines that the driver consistently drives within a designated speed of the speed limit, such as within 5 miles per hour of 55 miles per hour speed limit. Additionally and/or alternatively, the rate may increase during transit. For example, the predictive model may be configured to compute an increased rate when it determines that the driver opts into a route with increased vehicles and/or traffic. In another example, the rate may be adjusted after transit. For example, the predictive model may configured to compute a reduced rate when it determines that the driver consistently drives at a rate exceeding that of the speed limit, such as greater than 10 miles per hour over the 55 miles per hour speed limit.

The predictive model may be configured to apply one or more thresholds. For example, the rate may be dynamically adjusted during transit to one or more locations and based on a first threshold. In some examples, the first threshold may be associated with a first time user. In some examples, the rate may be dynamically adjusted during transmit to one or more locations and based on a second threshold. In some examples, the second threshold may be associated with a repeat user. For example, the first time renter may or may not be more risk-prone than a repeat renter and the rate may be adjusted to incentivize the first time renter if they drive safely and have a risk-averse driving or accident history. Even though a first time renter may not have past rental information, the rate may still be dynamically adjusted due to pick up and drop off location, time of today, and age.

In some examples, the predictive model may be supplemented with one or more sets of additional data. For example, the predictive model may be supplemented with a third set of data. Without limitation, the third set of data may comprise at least one selected from the group of gasoline price data and user accident history data. The third set of data may be retrieved from one or more servers 140, databases 160, and/or client application 105. For example, a user may rent a vehicle and picks it up in a first location, such as Richmond, VA, and schedule a drop off in a second location, such as Washington, D.C. If an accident occurs during this transit, this information may be taken into account for the present user and future users, and without limitation be consolidated for vehicle type and user. In addition, if a route is determined to be more risk-prone or historically accident-prone, this information may be used to train the predictive model and thereby adjust the rate. In some examples, the rate may be adjusted based on a fixed route from one location to a second location, such as utilizing a route based on EZ® pass. The predictive model may be configured to adjust the rate based on information, including but not limited to historically-accident prone information and traffic conditions. For example, when renting a vehicle in Richmond, VA and dropping it off in Washington, D.C, the probability of an accident may be a first percentage based on the historically-accident prone information and the traffic conditions. In contrast, the probability of an accident may be a second percentage, lower than the first percentage, based on the historically-accident prone information and the traffic conditions when renting a vehicle in a small town in Idaho and dropping it off in a second small town in Idaho. For example, this may be due to the less frequent number of vehicles traveled, and thus the rental insurance price may be priced at a lower rate if the vehicle was rented in a less densely populated region, such as Idaho, as opposed to a highly populated region, such as the Washington, DC metro area.

In some examples, the one or more servers 140 may be configured to determine one or more types of liability activity, including liability-increasing activity and liability-decreasing activity. For example, liability-increasing activity or liability-decreasing activity may be based on at least one selected from the group of user accident history data, vehicle accident history data, route information associated with a rental session, traffic activity during rush hour and/or designated times of the day, week, month, and year which may take into account events and/or holidays and/or seasons, and any combination thereof. For example, the liability-increasing activity may include a user at risk or prone to or encounter accidents based on their prior accident history, the vehicle used for renting, and the route undertaken. In another example, liability-decreasing activity may include a user unlikely to be prone to or encounter accidents, or at reduced risk in comparison to liability-increasing activity, based on their prior accident history, the vehicle used for renting, and the route undertaken. Each of these activities may be evaluated over a predetermined time, for example, within a given time period including seconds, minutes, hours, days, weeks, months, and/or years to determine a frequency for each of the prior accident history, vehicle used for rending, and route undertaken. In some examples, the one or more servers 140 may determine one or more outcomes associated with a user engaging in liability-increasing activity or liability decreasing activity. The one or more servers may be configured to update the predictive model and thus the outputted rate based on the one or more outcomes.

The predictive model may be supplemented with a fourth set of data. Without limitation, the fourth set of data may include personal data. In some examples, the fourth set of data may include prior rental information. For example, the predictive model may be supplemented with the fourth set of data to assess liability or personal risk. The fourth set of data may be retrieved from one or more servers 140, databases 160, and/or client application 105.

In some examples, the one or more thresholds may be adjusted based on continuous acquisition of the first set of information, the second set of information, the third set of information, the fourth set of information, or any combination thereof so as to update the predictive model and displayed rate.

Figure 2:
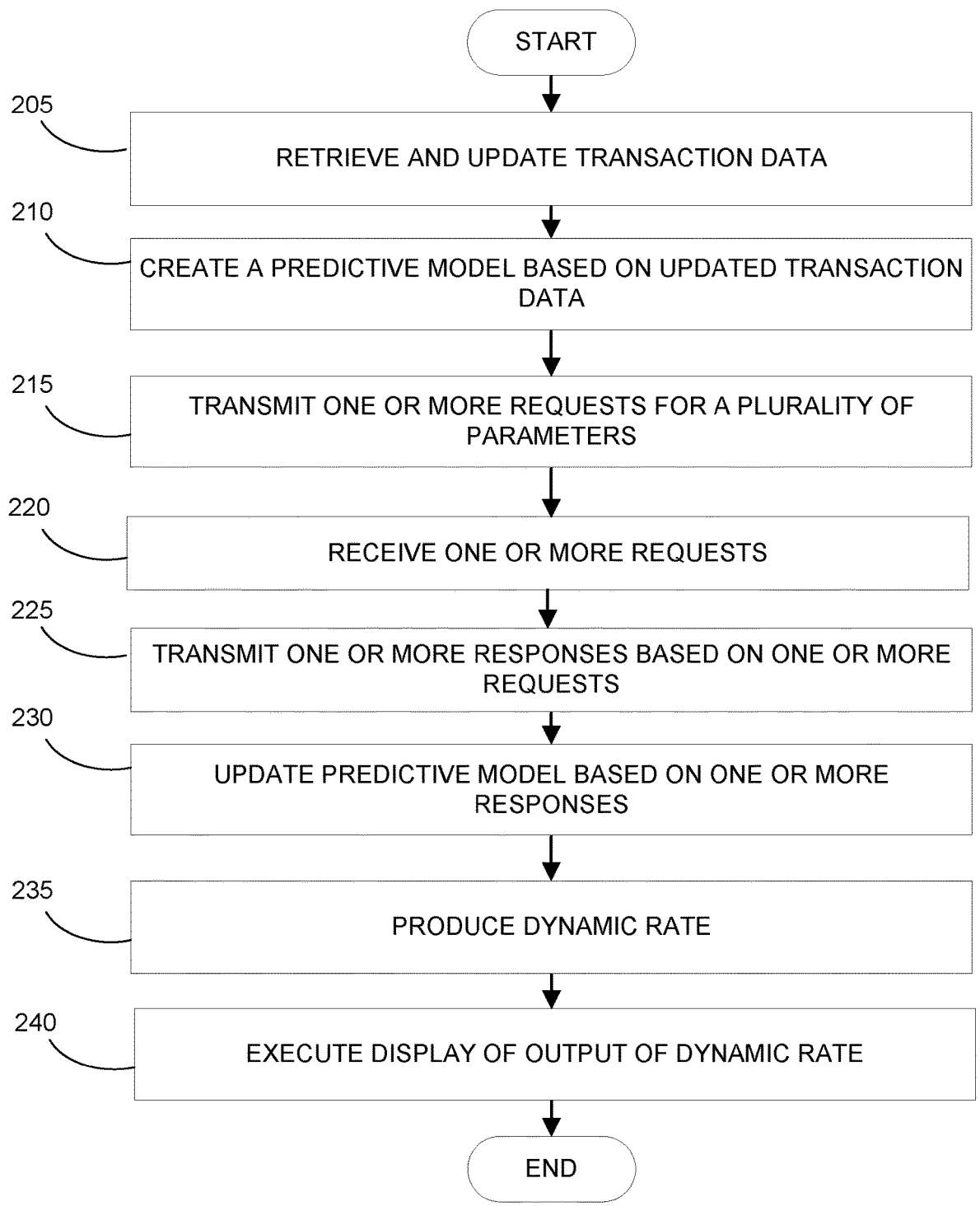
FIG. 2 depicts a method of generating a predictive model according to an exemplary embodiment.

FIG. 2 depicts a method 200 of generating a predictive model. FIG. 2 may reference same or similar components of system 100 of FIG. 1.

At block 205, the method may include retrieving, by one or more processors, transaction data. The transaction data may be updated to include at least one selected from the group of mileage data and rental data. In some examples, at least one selected from the group of mileage information and rental information may be derived from the transaction information. Without limitation, the transaction data may further comprise at least one selected from the group of debit card transaction data, credit card transaction data, and account transaction data.

In some examples, mileage information may be derived from the transaction information. For example, an initial transaction may occur at the start of the rental session, e.g., when a rental vehicle is obtained, and a subsequent transaction may occur at the end of the rental session, e.g., when the rental vehicle is returned. Location information associated with the transaction, such as location information relating to the rental vehicle pickup and return locations, may be collected. Additional location information relating to movement of the rental vehicle, including without limitation, Global Positioning System (GPS) data, can be collected from various sources. For example, GPS data may be collected by the client device, the client application, and/or another application or device in data communication with or accessible to the server. Mileage information may then be estimated from the location information. The location information may be collected continuously or upon the start and conclusion of the rental session, and the location data may be included in data used to update and train the predictive model.

In some examples, rental information may be derived from the transaction information. Rental information can include, without limitation, rental agency, type of rental (e.g., short-term, long-term, same day), dates, duration, number of drivers, driver identification, and restrictions (e.g., geographic or mileage limitations). The rental information may be collected continuously or upon the start and conclusion of the rental session, and the location data may be included in data used to update and train the predictive model.

At block 210, the method may include training, by the one or more processors, a predictive model based on the transaction data, including but not limited to the updated transaction data. Based on the transaction data, one or more servers may be configured to create a predictive model. For example, the predictive model may be trained by machine learning using at least one algorithm selected from the group of a gradient boosting machine algorithm, a logistic regression algorithm, and a neural network algorithm. As the predictive model continues to be trained, it increases its specificity and becomes more targeted to a particular individual. In some examples, the more frequent an individual rents, such as via the client application, the better the rate may be, thereby improving the user interaction experience. However, as further explained below, the rate may be subject to one or more conditions, including but not limited to user accident history, vehicle accident history, and transit route. In some examples, if there is another bill associated with the same vehicle, then this information may be analyzed by the server to determine if there is an indication that one or more transactions of the bill is associated with an accident. Thus, the predictive model may be configured to take into account additional bills of transactions, including but not limited to vehicle gas bills and vehicle accident bills, that may be related to the same vehicle, and thereby be configured to adjust and respond to analysis of bills.

At block 215, the method may include transmitting, by the one or more processors, one or more requests for a plurality of parameters including at least one selected from the group of location data, date data, time data, name data, and age data. To update and train the predictive model, the one or more servers may be configured to transmit one or more requests to the client application. In some examples, the one or more requests may include a request for a second set of data. The location data may include pick up and drop off location for the vehicle.

At block 220, the method may include receiving, by the one or more processors, the one or more requests including the plurality of parameters. The client application may be configured to receive the one or more requests from the one or more servers. For example, the client application may be configured to receive one or more requests including a request for the plurality of parameters.

At block 225, the method may include transmitting, by the one or more processors, one or more responses based on the one or more requests. Responsive to the one or more requests from the one or more servers, the client application may transmit one or more responses to the one or more servers. For example, the one or more responses may include the requested plurality of parameters.

At block 230, the method may include updating, by the one or more processors, the predictive model based on the one or more responses. The one or more servers may be configured to receive the one or more responses from the client application. In some examples, the one or more servers may be configured to update the predictive model based on the second set of data received from the client application.

At block 235, the method may include producing, by the one or more processors, a dynamic rate based on the updated predictive model.

At block 240, the method may include executing, by the one or more processors, a display of an output of the dynamic rate. The one or more servers may be configured to transmit the dynamic rate to the client application. As further explained herein, in some examples, the rate may be dynamically adjusted for cheaper or safer users. As further explained herein, in other examples, the rate may be dynamically adjusted for unsafe or risk-prone users. By lowering the pricing of the rate, the users may be incentivized who would not normally obtain rental insurance.

The client application may be configured to receive the dynamic rate from the one or more servers. In some examples, the client application may output the dynamic rate based on the updated predictive model via at least one selected from the group of a pop-up notification, email, display, video, short message service, multimedia messaging service, and the like. Moreover, the client application may be configured to display a plurality of options based on the dynamic rate. The plurality of options may include a plurality of rates that include accompanying descriptions for each rate. In one example, at least one of the rates may be categorized as a basic version for rental insurance. Without limitation, the basic version may be priced at the lowest cost, and the scope of coverage may include only include accidents that occur under a designated speed limit, a designated time of day, week, month, or year which may take into account events and/or holidays and/or seasons, and a designated amount for damage, or any combination thereof. In another example, at least one of the rates may be categorized as an intermediate version for rental insurance. Without limitation, the intermediate version may be priced at a cost between the basic version and the advanced version, and the scope of coverage may include limited damage to the vehicle, personal injury protection to one or more drivers that exceeds coverage than that which is prescribed in the basic version yet is more restrictive than the coverage that is prescribed in the advanced version. In yet another example, at least one of the rates may be categorized as an advanced version for rental insurance. Without limitation, the advanced version may be priced at the highest cost, and the scope of coverage may include all damages to the vehicle, personal injury protection, and additional drivers, or any combination thereof.

For example, the client application may be configured to receive a selection of at least one option based on the dynamic rate. In some examples, prior to display of the dynamic rate, the client application may be configured to prompt a user to perform at least one selected from the group of inputting one or more login credentials and creating an account.

In some examples, once a user selects, via client application, at least one option of the rate, the predictive model may be configured to adjust the rate during transit or after completion of a rental session. For example, if the predictive model determines that the user drives safely and encounters minimal to zero accidents, the rate may decrease from one price, such as $30, to a second price, such as $20, after the vehicle is dropped off at a destination so as to terminate the rental session. In another example, if the predictive model determines that the user did not drive safely and encounters an accident, the rate may increase from one price, such as $30, to a second price, such as $40, after the vehicle is dropped off at a destination so as to terminate the rental session. In some examples, the rate may decrease during transit. In one example, the predictive model may be configured to compute a reduced rate when it determines that the driver opts into a route with reduced vehicles and/or traffic. In another example, the rate may be adjusted after transit. For example, the predictive model may configured to compute a reduced rate when it determines that the driver consistently drives within a designated speed of the speed limit, such as within 5 miles per hour of 55 miles per hour speed limit. Additionally and/or alternatively, the rate may increase during transit. For example, the predictive model may be configured to compute an increased rate when it determines that the driver opts into a route with increased vehicles and/or traffic. In another example, the rate may be adjusted after transit. For example, the predictive model may configured to compute a reduced rate when it determines that the driver consistently drives at a rate exceeding that of the speed limit, such as greater than 10 miles per hour over the 55 miles per hour speed limit.

The predictive model may be configured to apply one or more thresholds. For example, the rate may be dynamically adjusted during transit to one or more locations and based on a first threshold. In some examples, the first threshold may be associated with a first time user. In some examples, the rate may be dynamically adjusted during transmit to one or more locations and based on a second threshold. In some examples, the second threshold may be associated with a repeat user. For example, the first time renter may or may not be more risk-prone than a repeat renter and the rate may be adjusted to incentivize the first time renter if they drive safely and have a risk-averse driving or accident history. Even though a first time renter may not have past rental information, the rate may still be dynamically adjusted due to pick up and drop off location, time of today, and age.

In some examples, the predictive model may be supplemented with one or more sets of additional data. For example, the predictive model may be supplemented with a third set of data. Without limitation, the third set of data may comprise at least one selected from the group of gasoline price data and user accident history data. The third set of data may be retrieved from one or more servers, databases, and/or client application. For example, a user may rent a vehicle and picks it up in a first location, such as Richmond, VA, and schedule a drop off in a second location, such as Washington, D.C. If an accident occurs during this transit, this information may be taken into account for the present user and future users, and without limitation be consolidated for vehicle type and user. In addition, if a route is determined to be more risk-prone or historically accident-prone, this information may be used to train the predictive model and thereby adjust the rate. In some examples, the rate may be adjusted based on a fixed route from one location to a second location, such as utilizing a route based on EZ® pass. The predictive model may be configured to adjust the rate based on information, including but not limited to historically-accident prone information and traffic conditions. For example, when renting a vehicle in a large city and dropping it off in another large city, the probability of an accident may be a first percentage based on the historically-accident prone information and the traffic conditions. In contrast, the probability of an accident may be a second percentage, lower than the first percentage, based on the historically-accident prone information and the traffic conditions when renting a vehicle in a small town and dropping it off in a second small town. For example, this may be due to the less frequent number of vehicles traveled, and thus the rental insurance price may be priced at a lower rate if the vehicle was rented in a less densely populated region, such as Idaho, as opposed to a highly populated region, such as the Washington, DC metro area.

In some examples, the one or more servers may be configured to determine one or more types of liability activity, including liability-increasing activity and liability-decreasing activity. For example, liability-increasing activity or liability-decreasing activity may be based on at least one selected from the group of user accident history data, vehicle accident history data, route information associated with a rental session, traffic activity during rush hour and/or designated times of the day, week, month, and year which may take into account events and/or holidays and/or seasons, and any combination thereof. For example, the liability-increasing activity may include a user at risk or prone to or encounter accidents based on their prior accident history, the vehicle used for renting, and the route undertaken. In another example, liability-decreasing activity may include a user unlikely to be prone to or encounter accidents, or at reduced risk in comparison to liability-increasing activity, based on their prior accident history, the vehicle used for renting, and the route undertaken. Each of these activities may be evaluated over a predetermined time, for example, within a given time period including seconds, minutes, hours, days, weeks, months, and/or years to determine a frequency for each of the prior accident history, vehicle used for rending, and route undertaken. In some examples, the one or more servers may determine one or more outcomes associated with a user engaging in liability-increasing activity or liability decreasing activity. The one or more servers may be configured to update the predictive model and thus the outputted rate based on the one or more outcomes.

The predictive model may be supplemented with a fourth set of data. Without limitation, the fourth set of data may include personal data. In some examples, the fourth set of data may include prior rental information. For example, the predictive model may be supplemented with the fourth set of data to assess liability or personal risk. The fourth set of data may be retrieved from one or more servers, databases, and/or client application.

In some examples, the one or more thresholds may be adjusted based on continuous acquisition of the transaction data, the plurality of parameters, the third set of data, the fourth set of data, or any combination thereof so as to update the predictive model and displayed rate.

Figure 3:
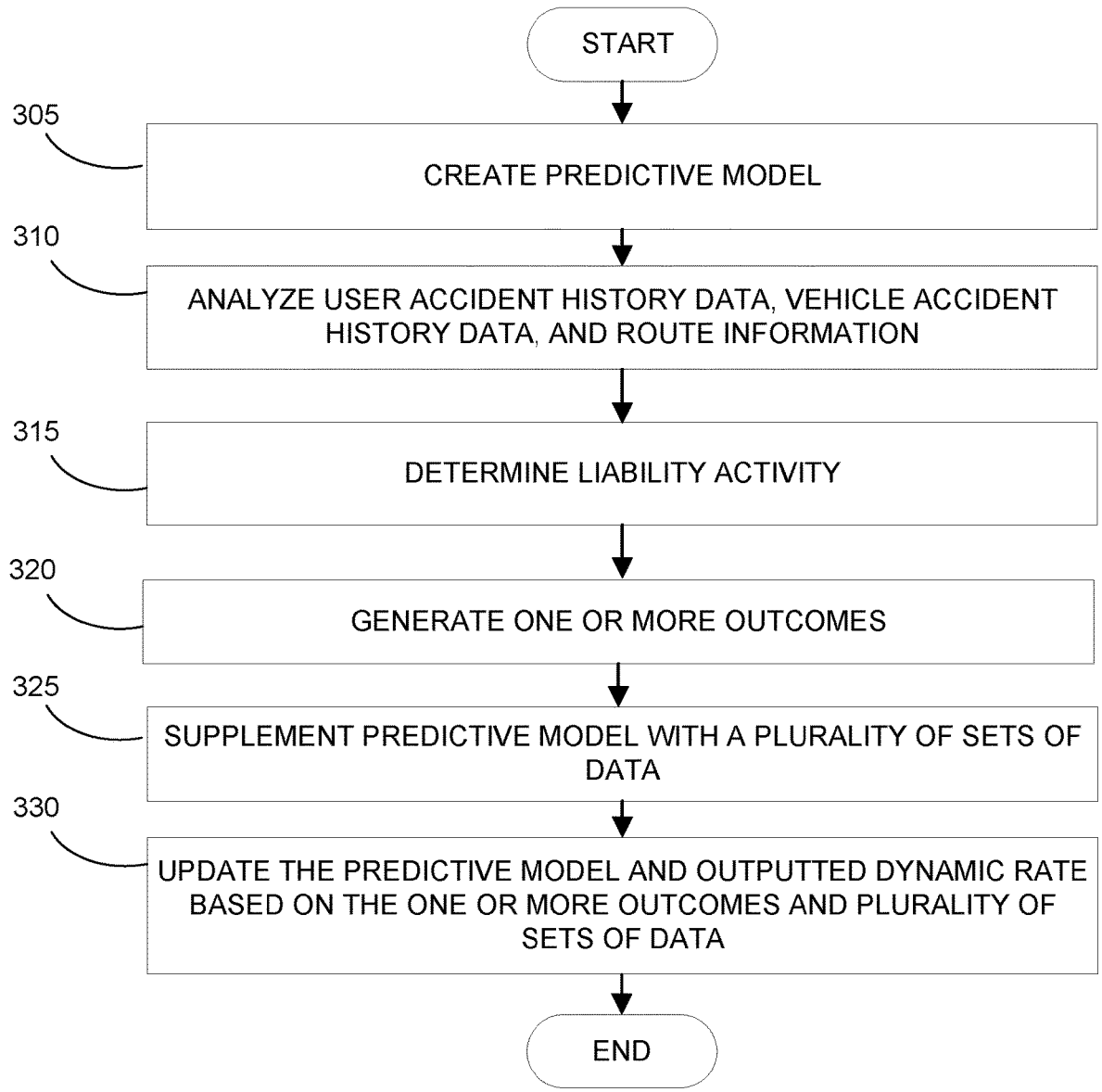
FIG. 3 depicts a method of determining a dynamic rate according to an exemplary embodiment.

FIG. 3 depicts a method 300 of determining a dynamic rate according to an exemplary embodiment. FIG. 2 may reference same or similar components of system 100 of FIG. 1 and method 200 of FIG. 2.

At block 305, the method may include creating a predictive model.

At block 310, the method may include analyzing user accident history data, vehicle accident history data, and route information.

At block 315, the method may include determining liability activity. For example, one or more servers, similar to server 140, may be configured to determine one or more types of liability activity, including liability-increasing activity and liability-decreasing activity. For example, liability-increasing activity or liability-decreasing activity may be based on at least one selected from the group of user accident history data, vehicle accident history data, route information associated with a rental session, and any combination thereof. In one example, the liability-increasing activity may include a user at risk or prone to or encounter accidents based on their prior accident history, the vehicle used for renting, and the route undertaken. In another example, liability-decreasing activity may include a user unlikely to be prone to or encounter accidents, or at reduced risk in comparison to liability-increasing activity, based on their prior accident history, the vehicle used for renting, and the route undertaken. Each of these activities may be evaluated over a predetermined time, for example, within a given time period including seconds, minutes, hours, days, weeks, months, and/or years to determine a frequency for each of the prior accident history, vehicle used for rending, and route undertaken.

At block 320, the method may include determining one or more outcomes based on liability activity. In some examples, the one or more servers 140 may determine one or more outcomes associated with a user engaging in liability-increasing activity or liability decreasing activity.

At block 325, the method may include supplementing the predictive model with a plurality of sets of data.

At block 330, the method may include updating the predictive model and outputted dynamic rate based on the one or more outcomes and plurality of sets of data.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

I claim:
1. A system, comprising:
a server including a processor coupled to a memory, wherein the processor is configured to:
 receive a first set of data, the first set of data including at least one selected from a group of debit card transaction information, credit card transaction information, and account transaction information;
 update the first set of data;
 generate a predictive model for adjusting a rental insurance coverage policy rate by machine learning using at least one algorithm selected from a group of a gradient boosting machine algorithm, a logistic regression algorithm, and a neural network algorithm;
 receive a second set of data including gasoline price data and user accident history data;
 update the predictive model by training the predictive model based on the second set of data;
 generate an adjustable rate for a rental session based on the updated predictive model that is configured to apply one or more thresholds, wherein:
  the one or more thresholds are adjusted based on continuous acquisition of the first set of data, the second set of data, or any combination thereof, and
  the one or more thresholds comprise a first threshold associated with a first time user and a second threshold associated with a repeat user;
 transmit the adjustable rate to be selected by a user;
 generate a rental insurance coverage policy including the selected adjustable rate;

update the predictive model based on the continuous acquisition of the first set of data, the second set of data, or any combination thereof;

adjust the selected adjustable rate to reflect one or more determinations by the updated predictive model, the one or more determinations based on at least one event from a plurality of events occurring during a transit associated with rental insurance coverage, and the plurality of events including a predetermined number of accidents encountered and a route undertaken based on a traffic condition; and send the rental insurance coverage policy including the adjusted selected rate to the user upon completion of the rental session.

2. The system of claim 1, wherein the second set of data further includes rental location data, rental date data, rental time data, a name of a user data, and an age of the user data.

3. The system of claim 1, wherein the plurality of events further include a vehicle type.

4. The system of claim 1, wherein the rate is subject to one or more conditions including at least one selected from the group of a user accident history, a vehicle accident history, and a transit route.

5. The system of claim 1, wherein the rate is adjusted during a travel to one or more locations and based on a risk-adverse user.

6. The system of claim 1, wherein the rate is adjusted during a travel to one or more locations and based on a risk-prone user.

7. The system of claim 1, wherein the one or more determinations include at least one event selected from a plurality of events occurring after a transit associated with the policy.

8. The system of claim 7, wherein the rate is adjusted to account for vehicle speed in comparison to a predetermined speed limit.

9. The system of claim 1, wherein the rate is adjusted to account for during a travel to one or more locations using an electronic tolling pass.

10. A method, comprising:
receiving, by a processor, a first set of data, the first set of data including at least one selected from a group of debit card transaction information, credit card transaction information, and account transaction information;

updating, by the processor, the first set of data;

generating, by the processor, a predictive model for adjusting a rental insurance coverage policy rate by machine learning using at least one algorithm selected from a group of a gradient boosting machine algorithm, a logistic regression algorithm, and a neural network algorithm;

receiving, by the processor, a second set of data including gasoline price data and user accident history data;

updating, by the processor, the predictive model by training the predictive model based on the second set of data;

generating, by the processor, an adjustable rate for a rental session based on the updated predictive model that is configured to apply one or more thresholds, wherein:
the one or more thresholds are adjusted based on continuous acquisition of the first set of data, the second set of data, or any combination thereof, and the one or more thresholds comprise a first threshold associated with a first time user and a second threshold associated with a repeat user;

transmitting, by the processor, the adjustable rate to be selected by a user;

generating, by the processor, a rental insurance coverage policy including the selected adjustable rate;

updating the predictive model based on the continuous acquisition of the first set of data, the second set of data, or any combination thereof;

adjusting, by the processor, the selected adjustable rate to reflect one or more determinations by the updated predictive model, the one or more determinations based on at least one event from a plurality of events occurring during a transit associated with rental insurance coverage, and the plurality of events including a predetermined number of accidents encountered and a route undertaken based on a traffic condition; and sending, by the processor, the rental insurance coverage policy including the adjusted selected rate to the user upon completion of the rental session.

11. The method of claim 10, wherein the second set of data further includes rental location data, rental date data, rental time data, a name of a user data, and an age of the user data.

12. The method of claim 10, wherein the plurality of events further include a vehicle type.

13. The method of claim 10, wherein the rate is subject to one or more conditions including at least one selected from the group of a user accident history, a vehicle accident history, and a transit route.

14. The method of claim 10, wherein the rate is adjusted during a travel to one or more locations and based on a risk-adverse user.

15. The method of claim 10, wherein the rate is adjusted during a travel to one or more locations and based on a risk-prone user.

16. The method of claim 10, wherein the one or more determinations include at least one event selected from a plurality of events occurring after a transit associated with the policy.

17. The method of claim 16, wherein the rate is adjusted to account for vehicle speed in comparison to a predetermined speed limit.

18. The method of claim 10, wherein the rate is adjusted to account for during a travel to one or more locations using an electronic tolling pass.

19. A computer readable non-transitory medium comprising computer-executable instructions that are executed by a processor and comprise the steps of:
receiving a first set of data, the first set of data including at least one selected from a group of debit card transaction information, credit card transaction information, and account transaction information;

updating the first set of data;

generating a predictive model for adjusting a rental insurance coverage policy rate by machine learning using at least one algorithm selected from a group of a gradient boosting machine algorithm, a logistic regression algorithm, and a neural network algorithm;

receiving a second set of data including gasoline price data and user accident history data;

updating the predictive model by training the predictive model based on the second set of data;

generating an adjustable rate for a rental session based on the updated predictive model that is configured to apply one or more thresholds, wherein:
the one or more thresholds are adjusted based on continuous acquisition of the first set of data, the second set of data, or any combination thereof, and the one or more thresholds comprise a first threshold associated with a first time user and a second threshold associated with a repeat user;

transmitting the adjustable rate to be selected by a user;

generating a rental insurance coverage policy including the selected adjustable rate;

updating the predictive model based on the continuous acquisition of the first set of data, the second set of data, or any combination thereof;

adjusting the selected adjustable rate to reflect one or more determinations by the updated predictive model, the one or more determinations based on at least one event from a plurality of events occurring during a transit associated with rental insurance coverage, and the plurality of events including a predetermined number of accidents encountered and a route undertaken based on a traffic condition; and sending the rental insurance coverage policy including the adjusted selected rate to the user upon completion of the rental session.

20. The computer readable non-transitory medium of claim 19, wherein the first set of data comprises at least one selected from the group of vehicle gas bills and vehicle accident bills.

* * * * *